United States Patent [19]

Letemps et al.

[11] Patent Number: 4,820,327
[45] Date of Patent: Apr. 11, 1989

[54] BENDING AND TEMPERING OF GLASS PLATES ADVANCING ON A SHAPING BED CURVED IN THE DIRECTION OF ADVANCE

[75] Inventors: Bernard Letemps, Thourotte, France; Ignacio Gonzalez-Blasquez, Tarragone, Spain

[73] Assignee: Saint-Gobain Vitrage, Courbevoie, France

[21] Appl. No.: 103,413

[22] Filed: Oct. 1, 1987

[30] Foreign Application Priority Data

Oct. 1, 1986 [FR] France .................. 86 13704

[51] Int. Cl.⁴ .......................................... C03B 23/033
[52] U.S. Cl. .................................. 65/104; 65/107; 65/273; 65/287; 65/351
[58] Field of Search ............. 65/104, 107, 273, 287, 65/351

[56] References Cited

U.S. PATENT DOCUMENTS

| 3,545,951 | 12/1970 | Nedelec | 65/107 X |
| 4,139,359 | 2/1979 | Johnson et al. | 65/107 |
| 4,218,232 | 8/1980 | Wilhelm | 65/106 |
| 4,540,426 | 9/1985 | Bocelli et al. | 65/273 |
| 4,556,406 | 12/1985 | Kahle | 65/104 X |

FOREIGN PATENT DOCUMENTS

| 0133114 | 2/1985 | European Pat. Off. |
| 0143691 | 6/1985 | European Pat. Off. |
| 1420731 | 11/1965 | France |
| 2554437 | 5/1985 | France |

Primary Examiner—Arthur Kellogg
Attorney, Agent, or Firm—Oblon, Fisher, Spivak, McClelland & Maier

[57] ABSTRACT

A heated glass plate is bent by moving over a bed or rollers defining a path curved along the direction of movement of the glass plate so as to define an upwardly facing concavity. The glass plate moves with a speed of at least 10 cm/second and is curved by the bed without contact from above. The glass plate is subsequently tempered.

19 Claims, 2 Drawing Sheets

BENDING AND TEMPERING OF GLASS PLATES ADVANCING ON A SHAPING BED CURVED IN THE DIRECTION OF ADVANCE

BACKGROUND OF THE INVENTION

1. Field of the Invention:

This invention relates to the bending and tempering of glass plates during their advance on a shaping bed consisting of an array of shaping rollers placed along a path to form a bed having a profile curved in the direction of advance of the glass plates.

2. Discussion of Background:

It is known from the French patent document published under No. 2 433 488 to bend and temper glass plates simultaneously by having them advance in a device consisting essentially of two layers having cylindrical rollers placed along a curved profile, blowing nozzles being inserted between the rollers. The glass plates are rolled and pressed between the rollers of the two layers and simultaneously subjected to the blowing of cold air, so that they come out bent and tempered.

This prior device possess a high production capacity, but the glass does not have the desired qualities, particularly optical quality, and exhibits certain forming defects, in particular on the front edge and the back edge of the glass plates.

Moreover, it has been proposed by the French patent document published under No. 2 549 465, to have the glass plates advance between two curved layers of rollers in a bending and tempering machine to bend said plates the first time, then to temper them the second time, blowing nozzles then being inserted between the rollers of each layer, in a downstream zone of the machine which is reserved for tempering.

In this prior device, the glass plates rest on the rollers of the lower layer and are held by the rollers of the upper layer. It no longer involves, as in the preceding case, rolling and pressing of the glass plates between lower and upper rollers, but the upper rollers nonetheless exist, and even if they are mounted flexibly with springs to avoid pressing too strongly on the glass, they touch it and so exert a certain pressure which although weak nevertheless exists and which precisely because of its desired weakness necessitates a particular mounting of said upper rollers and a fine adjustment.

A certain complexity of the machine and a necessity of performing fine positioning adjustments of the rollers of the upper layer in relation to the rollers of the lower layer result. This complexity of machine and of adjustment is further increased when the rollers used are not cylindrical but are shaping elements with variable profile in the crosswise direction of the machine, such as curved rods.

Moreover, slight support marks of the rollers or equivalent elements can be visible, mainly in the case of poor adjustments, particularly on the enamel with which the periphery or other zones of the glazings are coated, this enamel not being totally hardened at the moment of the passage into the bending machine.

SUMMARY OF THE INVENTION

This invention aims at eliminating the drawbacks of the prior art, i.e., defects of the glazings, marks on the enamel deposited on the glazings and complexity of the machines.

It proposes for this purpose a bending and tempering process of glass plates advancing flat on a bed of rollers placed along a curved profile with an upturned concavity, in which the glass plates advance at a high speed at least equal to 10 cm/second and acquire a profile corresponding to the profile of the shaping bed under the combined effect of gravity and speed, without the support of top rollers or other upper holding means.

Advantageously, the curve of the shaping rollers has as a tangent the plane of the feeding means of the glass plates, so that the passage between the intake means to the shaping means is done without jerking.

Advantageously for rollers spaced a distance on the order of 30 to 70 mm and preferably on the order of 50 to 60 mm for glass 3 mm thick and at 650° C., the speed of advance of the glass plates is on the order of 10 to 24 cm/second and preferably on the order of 15 to 18 cm/second.

Preferably, at the end of the bending zone an aid to advancement is provided to the glass plates, particularly if the slope of said bending zone end is high and the glass plates have a tendency to slow down on the rollers, despite their rotation at constant speed, and to slide.

Also preferably, at the downstream limit of the bending zone, a barrier to the penetration of the tempering air into the bending zone is provided.

The invention also proposes a bending and tempering machine for glass plates comprising a bed of lower shaping rollers having a profile curved along the direction of advance of the glass plates, in which optional upper rollers are positioned above a curve connecting the tops of the lower rollers by a distance which is greater than the thickness of the glass plates to be treated, with the exception of a boundary roller located at the output end of the bending zone.

Advantageously, at the output end of the bending zone an aid to the advancement of the glass plates and a barrier to the tempering air toward the bending zone are provided, this aid and this barrier consisting of a pair of rollers including the boundary roller, placed in contact with the faces of the glass plates to be bent and tempered.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
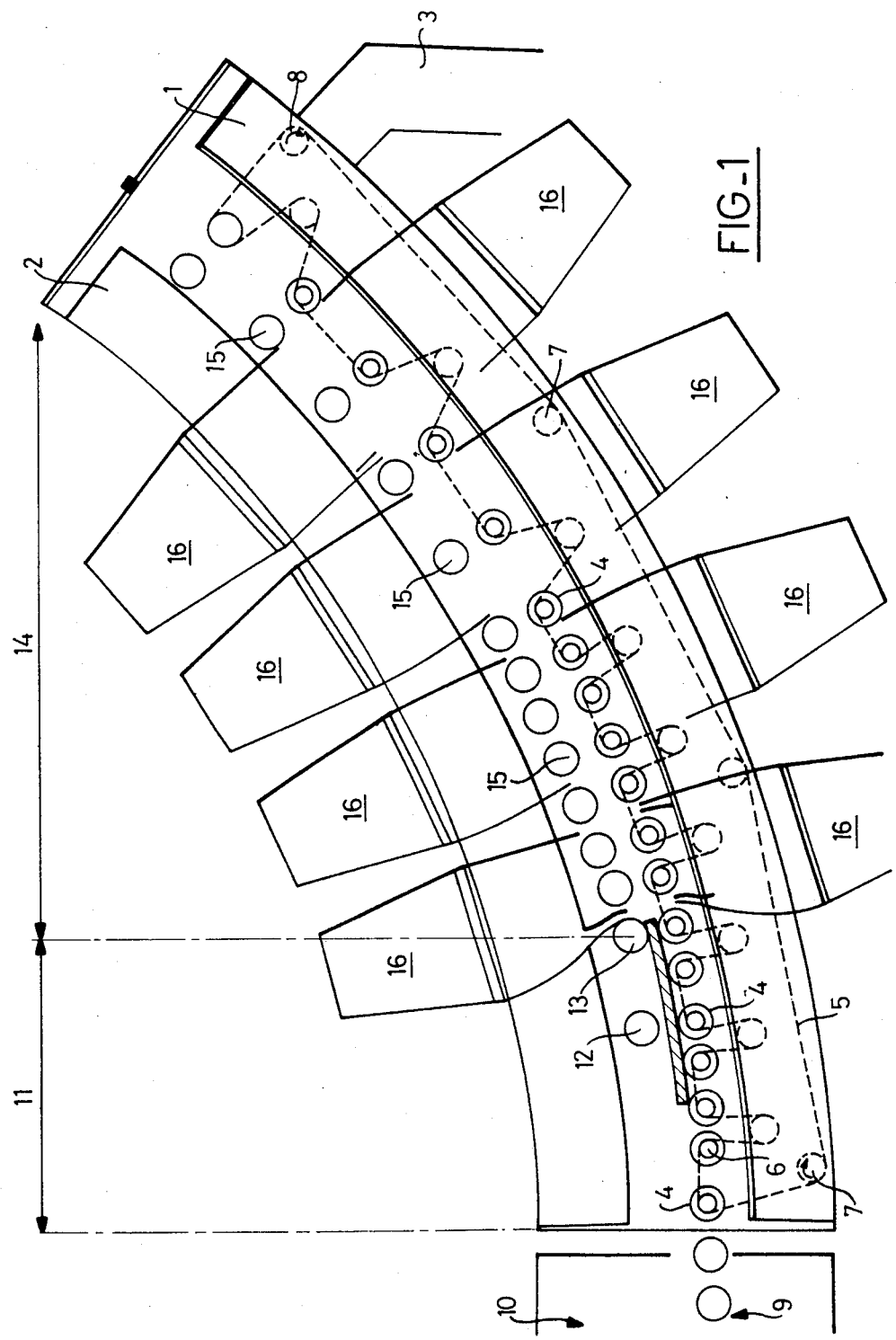
FIG. 1 is a diagrammatic view of an installation for bending and tempering of glass plates according to the invention.

The diagrammatic view of FIG. 1 shows a machine for bending and tempering of glass plates according to the invention, in which the glass plates are moved along a regular curved profile with an upturned concavity to define a bending zone 11 and a tempering zone 14.

In the bending and tempering machine, two chassis elements, a lower element 1 and an upper element 2, are curved in the direction of their length and carried by a frame 3. Lower element 1 is equipped with lower roller elements for support of the glass, such as straight rollers 4 placed parallel to one another and extending along the width of said element. The rollers 4 are rotatable about their longitudinal axes by, for example, a chain 5 engaging sprockets 6 placed at an end of the rollers, held taut by take up and return sprockets 7 and driven by a drive shaft 8. The array of rollers 4 define a shaping bed for the glass plates with a curved profile, positioned downstream from a conveyor 9 for the glass plates going through a furnace 10 for heating of the glass. Preferably, conveyor 9 is tangential to the shaping bed so as to offer a continuous path for the glass plates that is regular, so that the glass plates may move without jerking, cracking or jumping.

Upper element 2 does not have any rollers in the bending zone 11, except optionally rollers such as 12 that are separated in relation to lower rollers 4 by a large spacing, so that glass plates advancing on lower rollers 4, as they become bent on the shaping bed, do not normally touch them. If such upper rollers 12 exist, their position is adjustable in such a way that they are at least at a distance on the order of 0.3 or 0.4 mm from the upper surface of the glass.

Thus, when glass plates 3 mm thick are introduced into the machine, optional upper rollers 12 are adjusted so that they are 3.3 or 3.4 mm, even 3.6 mm or more, from a curve connecting the tops of the lower rollers 4.

These upper rollers 12 can be placed approximately directly above lower rollers 4. Within the boundary of the bending zone 11, just before the tempering zone 14 of the machine, upper chassis element 2 is equipped with a means for aiding the advancement of the glass plates and a barrier to the penetration of the tempering air into the bending zone. Advantageously, the functions of these two means are performed by one and the same element consisting of an upper boundary roller 13 placed so as to be in contact with the upper surface of the glass plates, this upper boundary roller 13 being mounted on chassis element 2 opposite lower roller 4 at the end of the bending zone with a spacing no greater than the thickness of the glass plate and being driven at the same speed as lower rollers 4.

Advantageously, to avoid too great a pinching pressure on the glass, this upper boundary roller 13 is adjustably and elastically positioned, for example as described in said French patent document No. 2 549 465.

To facilitate the advance of the glass plates within the bending zone 11, if this zone is long and the glass plates are poorly driven, two or three upper boundary rollers 13 can be used.

In the tempering zone 14, which immediately follows bending zone 11, in addition to the lower support elements consisting of rollers 4, upper rollers 15 of the same type as boundary rollers 13 are positioned to be in contact with the glass and press on it with a predetermined pressure, as are blowing nozzles 16 for blowing a cooling gas, in general air, over the glass to temper it. These nozzles 16 are placed so as to blow the cooling gas both on the lower face and the upper face of the glass. They have pipes or slots which, both on the top and on the bottom, come close to the faces of the glass plates. However, for clarity of the drawings, these pipes and slots are not shown, only the main ducts that lead to the pipes or slots are shown.

The removal of the glass plates at the downstream boundary of the tempering zone 14 can be achieved as described in said French patent document No. 2 549 465, i.e., by a swinging unit not shown in the figures, for delivering the glass plates to an approximately horizontal conveyor, not shown.

Figure 2:
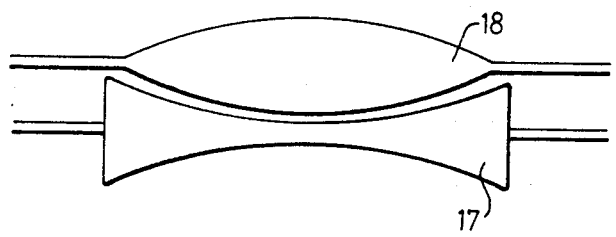
FIG. 2 is a view of a pair of rollers having a curved profile that can be placed at the output of the bending station.

If a complex curvature is desired for the glass plates, the last pair of rollers of bending zone 11, serving to block the passage of the tempering air toward the bending zone and to aid in the advance of the glass plates, consist of rollers 17 and 18 which are not cylindrical, but shaped with complementary shapes as shown in FIG. 2.

Thus, for example, lower roller 17 can be longitudinally concave, while upper roller 18 can be longitudinally convex or vice-versa.

Figure 3:
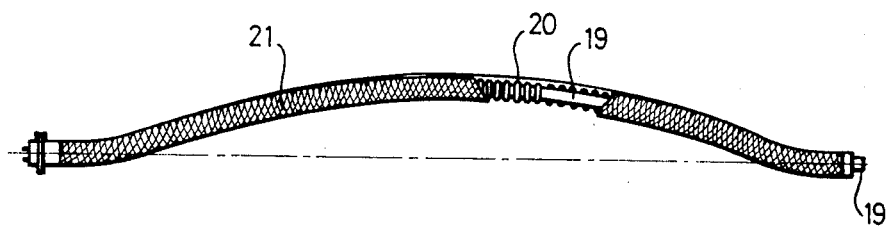
FIG. 3 is a view of a pair of rollers consisting of curved rods covered with a rotating tubular sleeve.

In a variant that makes it possible to obtain glass plates of complex shape, i.e., having a curvature in the longitudinal direction and a curvature in the crosswise direction, such as an approximately spherical cap, lower rollers 4 and upper rollers 12, 13 and 15 of the overall installation consist of longitudinally curved rollers. They can be curved rods 19 as shown in FIG. 3, each covered with a rotating tubular sleeve 20 that is axially flexible but rigid in rotation, resting on its curved rod 19 by graphite sliding rings, the sleeve 20 covered with a protection 21 of braided or woven glass or silica threads. They can also be curved rollers of another type, for example, rollers curved by counterbending or by stress exerted on their ends.

At the end of the bending zone 11, two curved rollers such as curved rods 19 frame the glass plates, aid them in advancing and prevent the passage of the tempering air toward the bending zone. Curved shaping elements such as rods 19, covered with sleeves 20 and protections 21 are described in detail in French patent documents 1 476 785, 92 064, 2 129 919, 2 144 523 and 2 189 330.

Advantageously, to facilitate access to the inside of the machine, lower chassis 1 and upper chassis 2 can be separated from one another, for example by jacks (not shown) or, in a variant, they are able to pivot in relation to one another around a laterally-placed hinge (oyster opening).

The bending of glass plates in the machine described above, without exerting pressure on the upper face of the glass plates, is described below.

The glass plates are heated to their bending and tempering temperature while going through heating furnace 10. They are then at a temperature greater than 610° C., preferably on the order of 630 to 650° C. They enter the bending/tempering machine smoothly and without jerking, the curved path that they have to travel in said machine having as a tangent the path in furnace 10.

Their speed is high, at least equal to 10 cm/second, on the order of 10 to 24 cm/second and preferably 15 to 18 cm/second.

The pitch of rollers 4 in the bending machine is on the order of 30 to 70 mm and, for example, on the order of 50 to 60 mm for glass approximately 3 mm thick at 650° C. Because of the high speed of advance of the glass plates, their weight and their temperature, they naturally take the shape of the shaping bed consisting of rollers 4, without sagging between said rollers.

Upper rollers 12 which can be present in the machine and which delimit a passage for the glass at least 0.3 mm greater than the thickness of the glass, and preferably on the order of 0.4 to 0.6 mm greater, normally do not intervene in the bending. Not driven in rotation by a drive means, they remain immobile, which is a sign of their inoperativeness in normal operation.

However, in case the temperature of the glass is not completely satisfactory, and/or in case the speed of advance is too high, they constitute a safety means which prevent the glass from resting on two spaced rollers 4 of the shaping bed without touching intermediate rollers 4. Under these conditions the glass plate would be bent by a degree less than the curvature of the array of rollers 4 in the bending zone 11. Only then would a mid-portion of the top surface of the glass plate contact the rollers 12.

This can constitute means aiding in the adjustment of the optimal operating conditions of the machine, knowing that such optimal conditions are obtained when the upper rollers 12 have no action.

The bending of glass plates 3 mm thick and at 650° C., traveling at a speed on the order of 15 to 18 cm/second on a bed of lower rollers 4 with a pitch of approximately 50 to 60 mm can be obtained over a distance which is not greater than that occupied by 7 rollers and which, therefore, can be as short as 250 to 300 mm.

At the end of bending zone 11, the path to be traveled conforms to the curvature of the plates which is liable to cause a sliding of the glass plates. Moreover, the jets of blowing air of tempering zone 14 encounter a resistance to their penetration due to the front edge of the glass plates. Furthermore, these jets of cold air run the risk of cooling the bending zone and therefore of disturbing the bending.

For all these reasons, means are provided for aiding the glass to continue to advance smoothly and for forming a barrier to the tempering air. The glass plates, therefore, pass between two rollers: a lower roller 4 and the upper boundary roller 13 pressing elastically on the surface of the glass.

The glass then continues its advance along the same curved path in tempering zone 14, held this time by lower rollers 4 and upper rollers 15 and it is simultaneously subjected to the action of the blowing jets. Then it is removed from the machine.

If a complex bending is desired, a pair of rollers in the shape of the concave/convex type of FIG. 2 positioned at the end of the bending zone 11 obtains the expected result.

As a variant, the glass plates travel on a shaping bed consisting of curved rollers, particularly curved rods covered with rotating sleeves such as is shown in FIG. 3. The speeds and temperatures are on the same order as those already indicated.

In the case of a double curvature of the glass, it is preferred to obtain the curvature whose radius is smaller by use of the shaping bed with a profile curved in the longitudinal direction of the glass plates, while the larger radius curvature is obtained by the curvature of the curved rollers, etc., i.e. transverse to the direction of advance.

If the glass does not need to be tempered, the pair of lower 4 and upper 13 rollers is no longer necessary and can be eliminated if the slope of the bed of rollers 4 at the end of bending zone 11 is not too high and the glass plates can continue to advance smoothly without sliding. Actually, the difficulty created by the cool air of the tempering station no longer exists, and the difficulty of the front edge of the glass entering the air jets of the tempering blowing is also eliminated.

In addition to the exceptional optical quality of the glazings obtained in such a bending machine, there is also noted the ease of bending of glazings carrying coatings of enamel on their upper face, which at this stage of production are not yet totally hardened.

The absence of upper rollers, or their very separated position when they exist only as safety means, eliminates the danger of deterioration of the enamel during production.

Obviously, numerous modifications and variations of the present invention are possible in light of the above teachings. It is therefore to be understood that within the scope of the claims, the invention may be practiced otherwise than as specifically described herein.

What is claimed as new and desired to be secured by Letters Patent of the United States is:

1. A process for bending and tempering glass plates, comprising the steps of:

bending a heated glass plate by moving the glass plate to be bent at a speed of at least 10 cm/second along the top of a bed of rollers defining a path curved in the direction of movement of the glass plate, said curvature defining an upwardly facing concavity, without contacting the surface of said glass plate opposite said bed of rollers during the normal passage of said glass plate along said rollers, whereby the glass sheet acquires a curved profile corresponding to that of said bed;

advancing said glass plate through a tempering zone, which step of advancement includes contacting said glass plate at the face opposite said bed of rollers with an upper roller means; and tempering said bent glass plate.

2. The process of claim 1 wherein said glass plate is 3 mm thick and heated to between 630° C. and 650° C., and the speed of said glass plate is between 10 cm/second and 24 cm/second.

3. The process of claim 2 including the steps of providing means for aiding the advance of the glass sheet between said bending and tempering steps and providing means between said bending and tempering steps for preventing tempering fluid from contacting the glass plate during said tempering step.

4. The process of claim 1 including the step of feeding a glass plate to said bed along a path tangential to said curved path.

5. The process of claim 1 wherein said bending step comprises bending the glass plate to form curves in two orthogonal directions.

6. The process of claim 5 wherein said bending step comprises bending the glass plate such that a smaller radius one of said curves extends parallel to a length of said bed and a larger radius one of said curves extends transverse to the length of said bed.

7. A machine for bending and tempering glass plates, comprising:

a bed formed of an array of lower rollers, said bed being curved in the direction of the length of the array to define an upturned concavity, said bend comprising, at its upstream end, a bending zone, and downstream thereof a tempering zone;

means for feeding glass plates of a predetermined thickness to one end of said bed such that the glass plates move along the top of said lower rollers, the bed, in said bending zone, being so constructed so as to be free of any structure which would contact the glass plates on the surface opposite that in contact with the lower rollers, save for a roller means located opposite said lower rollers at the boundary between said bending and said tempering zone, which said roller means contacts the glass plate from above so as to advance it into the tempering zone;

means for providing tempering air to said tempering zone;

means for driving said lower rollers and said roller means so as to advance a glass plate along said bed at a minimium speed of 10 cm/second.

8. The machine of claim 7 including at least one upper roller in said bending zone, said upper roller being spaced from a curve connecting tops of said lower rollers by a height greater than said predetermined thickness by at least 0.3 mm.

9. The machine of claim 8 said rollers means comprising a boundary upper roller spaced from one of said lower rollers by a height no greater than said predetermined thickness and positioned at the boundary between said bending and tempering zones.

10. The machine of claim 9 wherein all of said rollers are cylindrical.

11. The machine of claim 9 wherein said boundary roller and said one of said lower rollers form a complementary shaped concave/convex roller pair.

12. The machine of claim 8 wherein said lower rollers comprise curved rods covered with a rotating flexible sleeve.

13. The machine of claim 12 wherein said at least one upper roller also comprises curved rod covered with a rotating flexible sleeve.

14. The machine of claim 7 said roller means comprising a boundary upper roller spaced from one of said lower rollers by a height no greater than said predetermined thickness an positioned at the boundary between said bending an tempering zones.

15. The machine of claim 14 wherein said boundary roller and said one of said lower rollers form a complementary shaped concave/convex roller pair.

16. The machine of claim 7 wherein all of said rollers are cylindrical.

17. The machine of claim 7 wherein said lower rollers comprise curved rods covered with a rotating flexible sleeve.

18. The machine of claim 7 wherein said feeding means comprise means for feeding glass plates in a direction tangential to the curvature of said bed at said one end.

19. The machine of claim 1 including means for rotatably driving said lower rollers.

* * * * *